(12) United States Patent
Verheijen et al.

(10) Patent No.: US 10,408,636 B2
(45) Date of Patent: Sep. 10, 2019

(54) APPARATUS AND METHOD FOR VEHICLE ECONOMY IMPROVEMENT

(71) Applicant: TomTom Telematics B.V., Amsterdam (NL)

(72) Inventors: Paul Roeland Verheijen, Heemstede (NL); Jasper Johannes Anthonius Paulwelussen, The Hague (NL); Christoph Ebert, Leipzig (DE); Steffen Orlowsky, Dessau-Roβlau (DE); Marco Leupold, Leipzig (DE); Stefan Kreim, Leipzig (DE); Alexander Schmidt, Halle (DE)

(73) Assignee: TOMTOM TELEMATICS B.V., Amsterdam (NL)

( * ) Notice: Subject to any disclaimer, the term of this patent is extended or adjusted under 35 U.S.C. 154(b) by 0 days.

(21) Appl. No.: 15/523,404

(22) PCT Filed: Nov. 26, 2015

(86) PCT No.: PCT/EP2015/077800
§ 371 (c)(1),
(2) Date: May 1, 2017

(87) PCT Pub. No.: WO2016/083518
PCT Pub. Date: Jun. 2, 2016

(65) Prior Publication Data
US 2017/0316686 A1 Nov. 2, 2017

(30) Foreign Application Priority Data

Nov. 26, 2014 (GB) .................................. 1420988.6
Mar. 12, 2015 (GB) .................................. 1504230.2

(51) Int. Cl.
*G08G 1/01* (2006.01)
*G01C 21/36* (2006.01)
(Continued)

(52) U.S. Cl.
CPC .......... *G01C 21/3697* (2013.01); *B60K 31/00* (2013.01); *B60R 16/0236* (2013.01);
(Continued)

(58) Field of Classification Search
CPC .... G08G 1/0137; G08G 1/052; G08G 1/0112; G08G 1/0129; G07C 5/085
See application file for complete search history.

(56) References Cited

U.S. PATENT DOCUMENTS 7,389,178 B2 * 6/2008 Raz ........................ G07C 5/085
340/903
8,090,598 B2 * 1/2012 Bauer .................... G06Q 40/02
705/4

(Continued)

FOREIGN PATENT DOCUMENTS

CN 102795224 A 11/2012
CN 103693042 A 4/2014
(Continued)

OTHER PUBLICATIONS

International Search Report dated Mar. 15, 2016 for application No. PCT/EP2015/077800.
(Continued)

*Primary Examiner* — Richard M Camby

(57) ABSTRACT

A method and apparatus is disclosed for evaluating the driving of a vehicle performing a journey on a road network, comprising determining at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network. A speed of the vehicle traversing the road network is determined at a plurality of times during the journey, and a value indicative of a consistency
(Continued)

of the speed of the vehicle within the at least one constant speed zone is further determined.

17 Claims, 5 Drawing Sheets

(51) Int. Cl.
| | |
|---|---|
| *B60R 16/023* | (2006.01) |
| *B60W 40/09* | (2012.01) |
| *G07C 5/00* | (2006.01) |
| *G07C 5/08* | (2006.01) |
| *B60K 31/00* | (2006.01) |
| *F16H 59/44* | (2006.01) |
| *F16H 59/46* | (2006.01) |
| *F16H 61/02* | (2006.01) |
| *B60W 50/14* | (2012.01) |
| *B60W 30/18* | (2012.01) |
| *G07C 5/02* | (2006.01) |
| *G07C 5/06* | (2006.01) |
| *G08G 1/0962* | (2006.01) |
| *G08G 1/0967* | (2006.01) |
| *G08G 1/0968* | (2006.01) |
| *G08G 1/052* | (2006.01) |
| *G01P 1/00* | (2006.01) |
| *F16H 63/42* | (2006.01) |
| *B60W 50/00* | (2006.01) |
| *F16H 59/70* | (2006.01) |
| *F16H 59/36* | (2006.01) |

(52) U.S. Cl.
CPC ...... *B60W 30/18* (2013.01); *B60W 30/18072* (2013.01); *B60W 30/18109* (2013.01); *B60W 30/18136* (2013.01); *B60W 40/09* (2013.01); *B60W 50/14* (2013.01); *F16H 59/44* (2013.01); *F16H 59/46* (2013.01); *F16H 61/0213* (2013.01); *F16H 61/0246* (2013.01); *F16H 63/42* (2013.01); *G01P 1/06* (2013.01); *G07C 5/004* (2013.01); *G07C 5/008* (2013.01); *G07C 5/02* (2013.01); *G07C 5/06* (2013.01); *G07C 5/085* (2013.01); *G07C 5/0816* (2013.01); *G07C 5/0825* (2013.01); *G07C 5/0841* (2013.01); *G08G 1/0112* (2013.01); *G08G 1/0129* (2013.01); *G08G 1/0137* (2013.01); *G08G 1/0141* (2013.01); *G08G 1/052* (2013.01); *G08G 1/0967* (2013.01); *G08G 1/09626* (2013.01); *G08G 1/09685* (2013.01); *G08G 1/096716* (2013.01); *G08G 1/096741* (2013.01); *G08G 1/096775* (2013.01); *G08G 1/096827* (2013.01); *G08G 1/096861* (2013.01); *B60K 2370/174* (2019.05); *B60W 2030/1809* (2013.01); *B60W 2030/18081* (2013.01); *B60W 2050/0078* (2013.01); *B60W 2510/0623* (2013.01); *B60W 2510/0638* (2013.01); *B60W 2510/0642* (2013.01); *B60W 2510/0647* (2013.01); *B60W 2510/1005* (2013.01); *B60W 2520/10* (2013.01); *B60W 2520/105* (2013.01); *B60W 2530/14* (2013.01); *B60W 2550/14* (2013.01); *B60W 2550/141* (2013.01); *B60W 2550/20* (2013.01); *B60W 2550/402* (2013.01); *B60W 2560/06* (2013.01); *B60W 2710/0655* (2013.01); *B60Y 2300/52* (2013.01); *F16H 59/70* (2013.01); *F16H 2059/366* (2013.01); *F16H 2061/0218* (2013.01); *F16H 2063/426* (2013.01); *G01C 21/3632* (2013.01); *G01C 21/3673* (2013.01); *Y02T 10/76* (2013.01); *Y02T 10/84* (2013.01)

(56) References Cited

U.S. PATENT DOCUMENTS

| | | |
|---|---|---|
| 2007/0256481 A1 | 11/2007 | Nishiyama et al. |
| 2011/0257832 A1 | 10/2011 | Isida et al. |
| 2012/0109510 A1 | 5/2012 | Ota et al. |
| 2012/0221170 A1 | 8/2012 | Tanoue et al. |
| 2013/0226622 A1 | 8/2013 | Adamson et al. |
| 2014/0058673 A1 | 2/2014 | Wolf |
| 2014/0350777 A1 | 11/2014 | Kawai et al. |

FOREIGN PATENT DOCUMENTS

| | | |
|---|---|---|
| DE | 102012218100 A1 | 4/2014 |
| EP | 2369159 A1 | 9/2011 |

OTHER PUBLICATIONS

Search Report dated Sep. 11, 2015 for GB Application No. 1504230.2.

* cited by examiner

A : current vehicle state data (OBD data and data derived therefrom)

B : aggregated events for determining performance indictors

C : statistics based on determined performance indicators

D : report data with determined performance indicators

APPARATUS AND METHOD FOR VEHICLE ECONOMY IMPROVEMENT

CROSS-REFERENCE TO RELATED APPLICATIONS

The present application is a National Stage of International Application No. PCT/EP2015/077800, filed on Nov. 26, 2015, and designating the United States, which claims benefit to United Kingdom Patent Application 1420988.6 filed on Nov. 26, 2014, and United Kingdom Patent Application 1504230.2 filed on Mar. 12, 2015. The entire content of these applications is incorporated herein by reference.

FIELD OF THE INVENTION

The present invention relates to a method and apparatus for evaluating vehicle driving, for example, for provision to a driver of the vehicle and/or to a manager of a fleet of vehicles. For example, the invention can in embodiments relate to the determination of the consistency of a speed of a vehicle when driving on a road network within determined constant speed zones of the road network, and wherein a higher consistency can lead to increases in fuel efficiency.

BACKGROUND OF THE INVENTION

Increasingly it is desired to improve a fuel economy of vehicles, particularly, although not exclusively, vehicles powered by fossil fuels, such as petrol and diesel. Although it will be realised that improving the fuel economy of any vehicle, including electric, hybrid and hydrogen powered vehicles, for example, is also desired. Some efforts at improving the fuel economy of vehicles are focussed on increasing an efficiency of the vehicle, such as a mechanical and/or electrical efficiency of the vehicle. It has also been realised that the manner in which a vehicle is driven can have a significant impact of the vehicle's economy.

It is known that vehicle economy suffers with increased acceleration. That is, where the vehicle is caused to accelerate for an increased amount of time and/or with increased severity the fuel economy of the vehicle suffers. Similarly the fuel economy of the vehicle suffers with increased amounts of braking since energy is lost to friction of the brakes and/or losses in an energy regeneration system of the vehicle, and subsequent acceleration is likely to be required.

Therefore it is desired to provide a method by which vehicle driving can be evaluated with respect to minimising unnecessary acceleration and braking events.

SUMMARY OF THE INVENTION

In accordance with a first aspect of the present invention there is provided a method of evaluating the driving of a vehicle performing a journey on a road network, comprising:

determining at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;

determining a speed of the vehicle traversing the road network at a plurality of times during the journey; and determining a value indicative of a consistency of the speed of the vehicle within the at least one constant speed zone.

The determination of the constant speed zone is based at least in part on positional data relating to the movement of devices having positional capability with respect to time along the segments, and which may be used to provide a positional "trace" of the path taken by the device. The devices may be any mobile devices associated with vehicles that are capable of providing the positional data, associated timing data, and in many cases associated speed data. The device may be any device having position determining capability. Typically the device may comprise a GPS or GSM device. Such devices may include navigation devices, mobile telecommunications devices with positioning capability, position sensors, etc. It will be appreciated that the positional data obtained from the plurality of devices may be referred to as "probe data". References to probe data herein should therefore be understood as being interchangeable with the term "positional data", and the positional data may be referred to as probe data for brevity herein.

The positional data is used to determine expected speeds of travel along the road network. The expected speeds of travel may in the form of a historic speed profile associated with a respective segment in map data representing the road network. In such embodiments, the historic speed profile is indicative of an average speed of travel of a plurality of vehicles along the respective segment at a plurality of predetermined time periods. Techniques of analysing positional to obtain average speed data are described, for example, in WO 2009/053411 A1; the entire content of which is incorporated herein by reference.

A constant speed zone can be determined when the positional data indicates at least one probe vehicle as having traversed a portion of the road network at a substantially constant speed. Thus, in an embodiment, a constant speed zone can be determined when the expected speed of travel from the historic speed profile from adjacent segments in the digital map are similar, e.g. differ by less than a predetermined threshold.

In embodiments, the constant speed zone is associated with validity information defining a validity period for the constant speed zone. The constant speed zone can be associated with at least a portion of a road in the road network.

In embodiments, the constant speed zone is further determined based upon a speed limit associated with a road in the road network.

The method may comprise determining whether the speed of the vehicle is at least a predetermined threshold speed. Additionally or alternatively, the method may comprise determining whether the speed of the vehicle is influenced by one or more of road and traffic conditions.

In embodiments, the determination of the value indicative of the consistency of the speed of the vehicle is based upon a threshold speed change. This can comprise determining the speed of the vehicle at first and second locations and determining whether a difference in speed at the first and second locations exceeds the threshold speed change.

In embodiments, the value indicative of the consistency of the speed of the vehicle is based on a duration for which the speed of the vehicle is substantially constant within the constant speed zone. The value indicative of the consistency of the speed of the vehicle can comprise a plurality of durations each associated with a respective category of road for which the speed of the vehicle is substantially constant within the constant speed zone. Additionally or alternatively, the value indicative of the consistency of the speed of the vehicle is based on a duration for which the speed of the vehicle is not substantially constant within the constant speed zone. The speed of the vehicle is not substantially constant within the constant speed zone preferably when a difference in speed at first and second locations exceeds a threshold speed change.

The method may comprise determining whether a location of the vehicle corresponds to a location of the constant speed zone.

In embodiments, the value indicative of the consistency of the speed of the vehicle within the constant speed zone is weighted according to a category of road associated with the constant speed zone.

The present invention extends to a system for carrying out a method in accordance with any of the aspects or embodiments of the invention herein described.

Thus, in accordance with a further aspect of the invention, there is provided a system for evaluating the driving of a vehicle performing a journey on a road network, comprising:

means for determining at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;

means for determining a speed of the vehicle traversing the road network at a plurality of times during the journey; and means for determining a value indicative of a consistency of the speed of the vehicle within the at least one constant speed zone.

As will be appreciated by those skilled in the art, these further aspects of the present invention can and preferably do include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its embodiments may be in the form of any suitable device. In general, the system of the present invention may be at least one processing device. The or a processing device may be part of a mobile device, such as a navigation device or vehicle tracking device, or part of a server. Regardless of its implementation, a device used in accordance with the present invention in any of its aspects or embodiments may comprise a processor and memory; the processor and memory cooperate to provide an execution environment in which a software operating system may be established.

Thus, in accordance with a further aspect of the invention, there is provided an apparatus for evaluating the driving of a vehicle performing a journey on a road network comprising: one or more processors; and a memory comprising instructions which, when executed by the one or more processors, cause the apparatus to:

determine at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;

determine a speed of the vehicle traversing the road network at a plurality of times during the journey; and determine a value indicative of a consistency of the speed of the vehicle within the at least one constant speed zone.

Methods in accordance with the present invention may be implemented at least partially using software, e.g. computer programs. The present invention thus also extends to a computer program comprising computer readable instructions executable to perform a method according to any of the embodiments of the invention.

The invention thus also extends to a computer software carrier comprising software which when used to operate a system or apparatus comprising data processing means causes, in conjunction with said data processing means, said apparatus or system to carry out the steps of a method in accordance with embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which.

DETAILED DESCRIPTION OF THE PREFERRED EMBODIMENTS

Embodiments of the invention are directed to methods and systems for monitoring the performance of drivers of vehicles over one or more journeys, and methods and systems for providing feedback to a driver in order to promote more economical driving.

Figure 1:
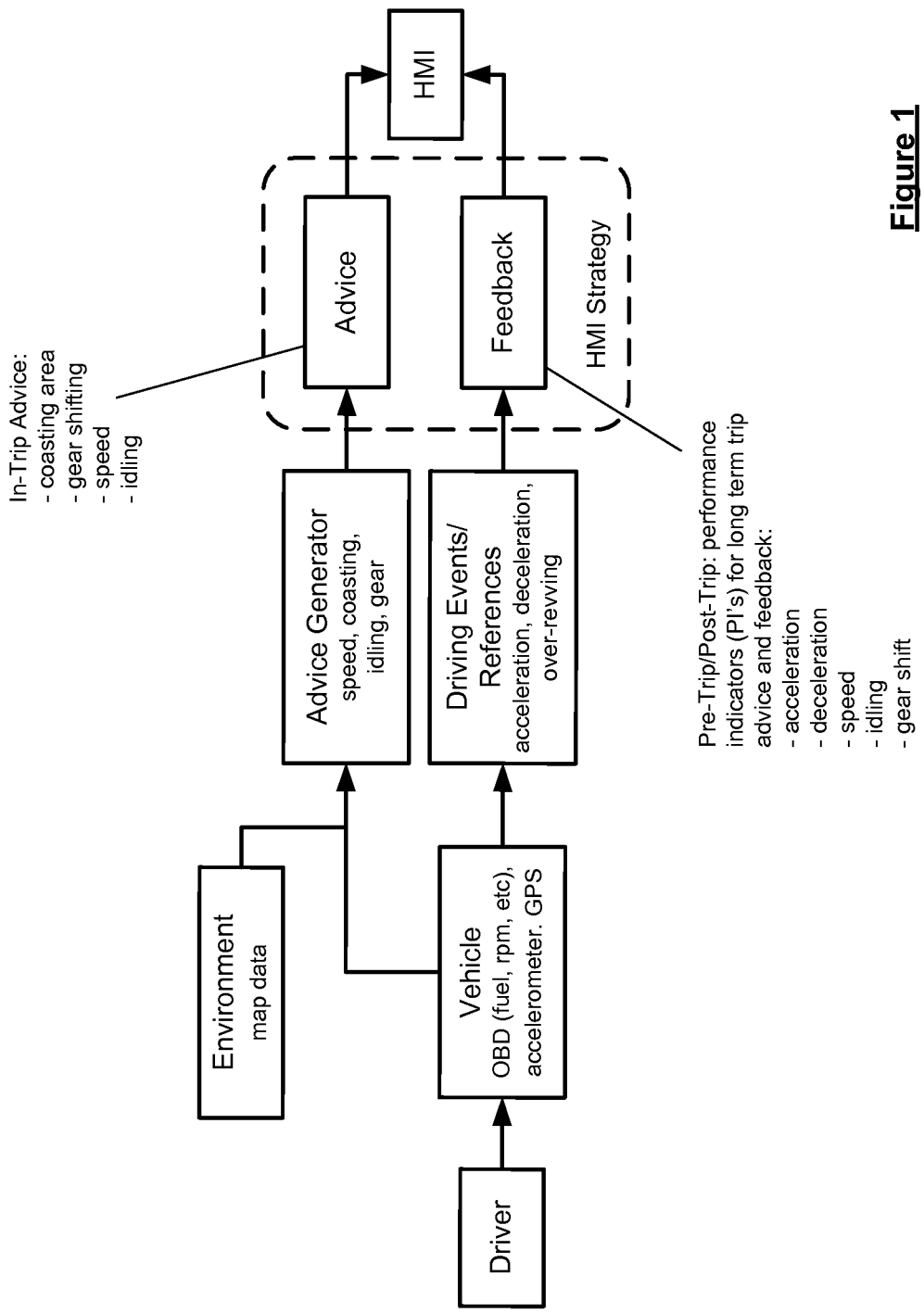
FIG. 1 is an illustration of a system for providing driver feedback.

An system for proving driver feedback is shown in FIG. 1. As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible; gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager.

The invention is directed to the generation of a new performance indicator for use in providing driver feedback, and to methods for determining data for use in the generation of such a performance indicator. A summary of the each of the aspects of the invention is given below:

- The determination of portions of a navigable, e.g. road, network at which a driver is able to drive at a constant speed (so called "constant speed zones"), based on time-dependent expected speeds of travel (e.g. taken from a digital map database), and optionally legal speed limits and/or live data, such as traffic, weather, etc, that would prevent the driver from travelling at the constant speed.
- The determination of a constant speed metric (or performance indicator) based on the amount of time a driver drove at constant speed when in a determined constant speed zone during a trip in relation to the total driving time within constant speed zones during the trip, optionally wherein the metric is split into categories based on road type, e.g. urban, extra-urban and motorway System Architecture The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
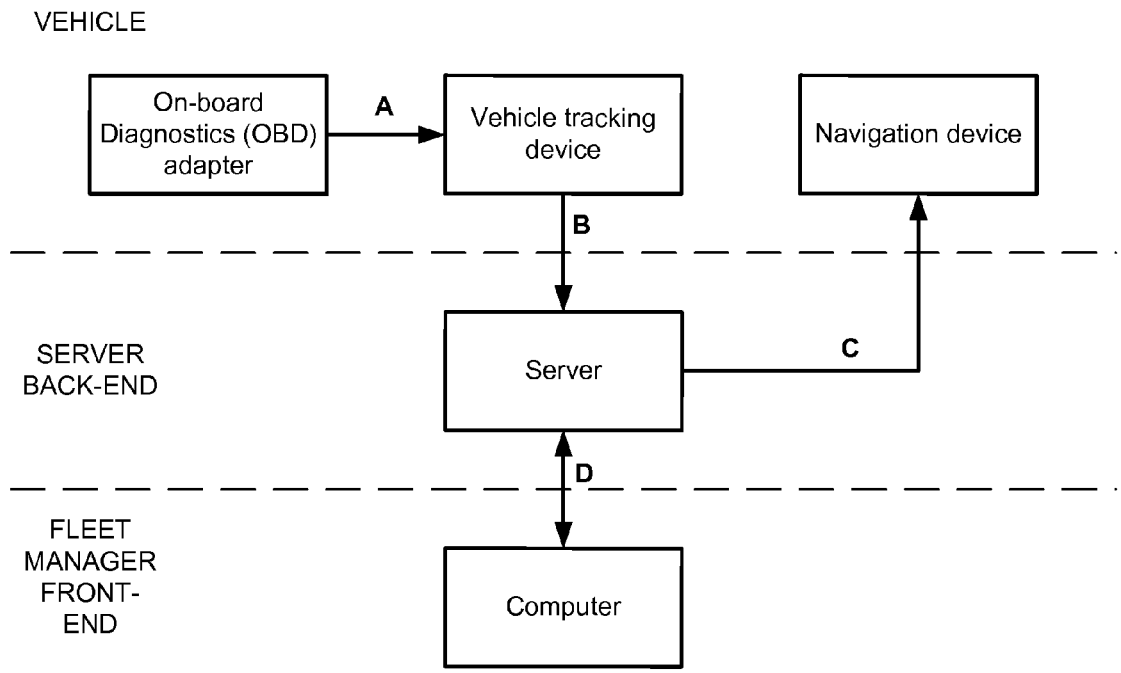
FIG. 2 is an illustration of a system according to an embodiment of the present invention.

The system of the invention is exemplified by FIG. 2 in which the vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD port provides the one or more parameters to the interface unit from a communication bus of the vehicle. It will be realised, however, that the interface unit may communicate with the vehicle via other connections such as a via a wireless connection. The adapter device is therefore preferably configured to collect data from the OBD port in the vehicle, such as engine speed (rpm), vehicle speed, and to determine other information derived from such OBD data, such as the current gear, maximum gear, fuel consumption, etc, and to deliver the data to the vehicle tracking device. In other words, the data transmitted, in a wired and/or wireless manner, to the vehicle tracking device is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators (as discussed in more detail below), e.g. a constant speed performance indicator. For constant speed, the tracking device enriches the tracking data with a speed variance and expected value over a past time period, e.g. the last 10 seconds, which can be used at the server to determine a more accurate constant speed performance indicator.

Navigation Device:

The navigation device comprises at least one processor and a display device. The navigation device may be capable of one or more of: calculating a route to be travelled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip.

Server:

The server comprises at least one processor and a communications device for communicating with one of more of the vehicular devices, preferably the vehicle tracking device. The at least one processor is arranged to determine from the tracking data obtained from the tracking device whether a vehicle is moving at a constant speed. The at least one processor is further arranged to calculate at least one performance indicator, e.g. the constant speed indicator, for a trip.

Computer:

The computer is in communication with the server, and is used by a fleet manager to review the performance of the drivers of their fleet of vehicles based on the determined performance indicators.

Constant Speed Zones

According to embodiments of the invention, there is provided methods and systems of determining portions of a navigable, e.g. road, network where it is possible to travel at a constant speed. The navigable network can be represented by a digital map. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. The nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the legal speed limit, etc.

In embodiments, at least some, and preferably each, of the segments of the digital map comprise data indicating an expected speed of travel along the segment at a plurality of different time periods. This data, which is typically derived from position data collected from a plurality vehicles that have travelled the segment in the past, and can thus be thought of as time-dependent average speed, can thus be used to determine a speed at any time of the day that a vehicle is expected to travel along the segment.

Constant speed zones can be defined, for example, as sections of the road network where the legal speed limit is constant and the difference in expected speeds of travel (for the relevant time) is less than a predetermined threshold, e.g. 10 km/h. Optionally live data indicative of traffic, weather, or any other transient events that may prevent a vehicle from travelling at a constant speed can be used to verify that a constant speed zone determined from the historical data is still applicable. The constant speed zones can be pre-processed and stored in the digital map, such that the only check is whether there is a live event, such as traffic, weather, etc, that prevents the user travelling at a constant speed. Alternatively, the constant speed zones can be determined when processing the position information during and/or after a trip.

Constant Speed Performance Indicator

The constant speed performance indicator is based on the recognition that it is desirable to avoid fluctuations in speed, i.e. accelerations and braking, and therefore to maintain a substantially constant speed for as long as possible, since this reduces fuel consumption.

In embodiments the tracking data, i.e. data indicating the current state of the vehicle, such as position, speed, etc, which can be collected by the vehicle tracking device and sent to the server at regular intervals, e.g. every 10 seconds, is analysed to determine whether the vehicle is travelling or did travel at a constant speed within a constant speed zone. The tracking data can be analysed in a real-time manner, or alternatively the tracking data can only be analysed after the completion of a trip. In embodiments, the tracking data from the vehicle tracking device can include one of more of the additional statistical data:

range of the speed (difference of minimum and maximum speed): The range is defined between first speed after the last position in the tracking log to the speed of the current position in the tracking log range of the speed change (difference of minimum and maximum speed change): The speed change refers always to the last speed obtained 1 second before. The range is defined between first speed change after the last position in the tracking log to the speed change of the current position in the tracking log This additional statistical data is indicative of the expected value and the variance of the speed since the last tracking data sent to the server, e.g. in the last 10 seconds. This statistical data allows abrupt speed changes to be detected between two sampling positions even if the sampling positions have a similar speed.

In embodiments a sliding window analysis is performed on the tracking data to filter out positions where constant speed driving is not possible, and then to identify, whether at the remaining positions, if the vehicle moved at a constant speed.

An exemplary method for filtering positions where constant driving is not possible is as follows:

Input:
  road speed limit of previous position, v_limit_p
  road speed limit of current position, v_limit_c
  speed of current position, v_c
  expected time-dependent speed of previous position, v_exp_p
  expected time-dependent speed of current position, v_exp_c Constraints:
  expected time-dependent speed deviation threshold, dv_t, e.g. 10 km/h
  minimum speed threshold, v_min, e.g. 30 km/h (since these low speeds are often caused by traffic jams which can make constant driving impossible)

Output:
  filtered constant speed zone/positions

Zone Detection Rules:
  current speed greater than minimum speed: v_c>v_min
  similar expected time-dependent speeds for the current and the previous position: |v_exp_c−v_exp_p|<dv_t
  no speed limit change: v_limit_c−v_limit_p=0

An exemplary method for detecting constant speed violations is as follows:

Input:
  speed of previous position, v_p
  speed of current position, v_c

Constants:
  speed alternation threshold, delta_v_t, e.g. 10 km/h (dependent on sample frequency)

Output:
  performance indicator

Violation Detection Rules:
  zone was not filtered out through the non-constant speed filtering (described above)
  speed alternation below speed alternation threshold: $|v\_c-v\_p|<delta\_v\_t$ The constant speed performance indicator is calculated based on the potential maximum time during a trip that constant speed driving was possible and the amount of time, in such constant speed zones, that the vehicle actually travelled at a constant speed. The constant speed performance indicator can be determined for different road types, e.g. urban, extra-urban and motorways.

Figure 3:
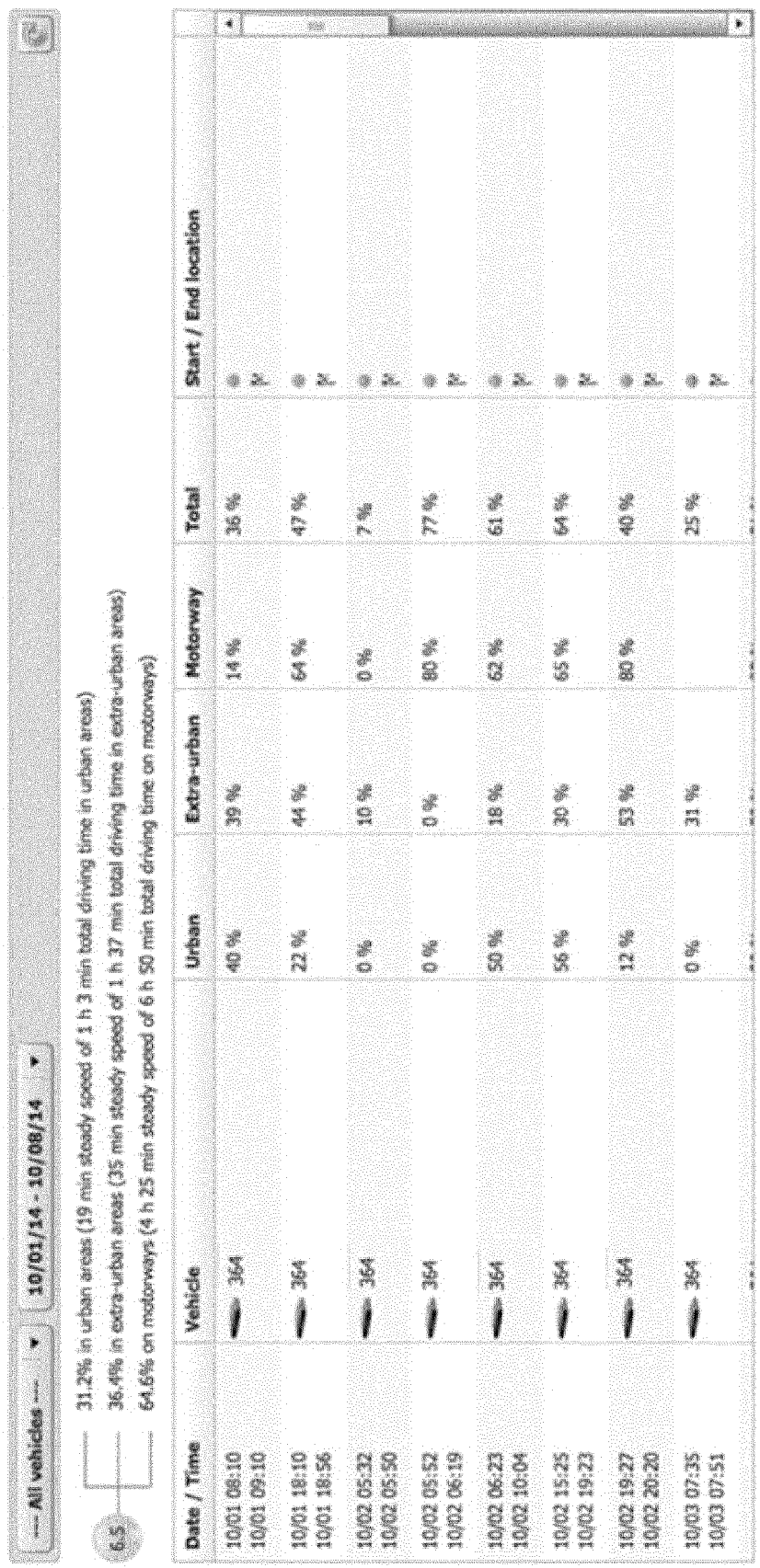
FIG. 3 is an illustration of an exemplary report as viewable on the computer of the fleet manager showing the constant speed performance metric for a plurality of trips made by a vehicle or driver.

An exemplary report as viewable on the computer of the fleet manager showing the constant speed performance metric for a plurality of trips made by a vehicle or driver is shown in FIG. 3. For example, in one journey on 1 October between 08h10 and 09h10 (total journey time of 50 minutes), the driver drove at a constant speed for 36% of the total time it was possible. The report also shows for that particular journey that the driver drove a constant speed for: 40% of time it was possible in urban areas; 39% of the time it was possible in extra-urban areas; and only 14% of the time it was possible on motorways (or highways). The report also shows an overall score for the driver across all journeys of 6.5, wherein the driver has driven at a constant speed when possible for 31.2% of the time in urban areas, 36.4% of the time in extra-urban areas and 64.6% of the time on motorways.

In embodiments, an advice can be shown to the driver of the vehicle on the display of the navigation device when there are too many speed fluctuations in a predetermined time and/or distance.

A further description of embodiments of the invention will now be described with reference to FIGS. 4 to 7.

Embodiments of the invention evaluate the maintenance of an average speed with respect to portions of a road network where it is possible to maintain a consistent average speed. In order to determine the portions of the road network where it is possible to maintain a consistent average speed probe data is utilised.

Figure 4:
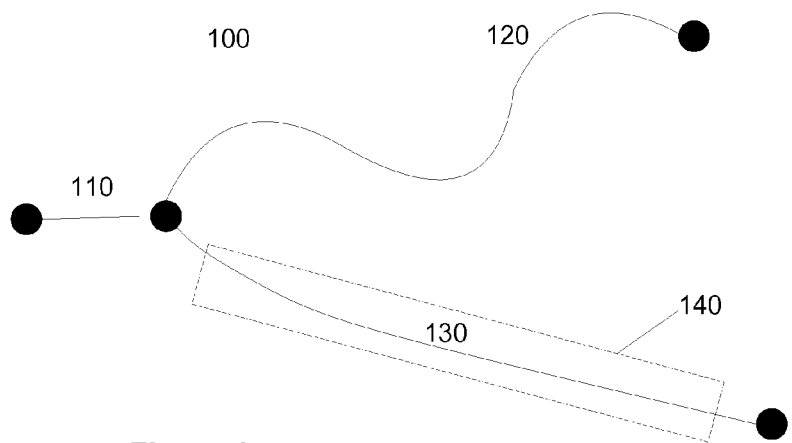
FIG. 4 shows an exemplary portion of map data relating to a road network.

FIG. 4 illustrates a portion of map data 100 comprising a plurality of road segments interconnecting a plurality of nodes (not all of which are given reference numerals for clarity). In particular the map data comprises a first road segment 110, a second road segment 120 and a third road segment 130.

Digital map data representing navigable real-world paths in a network may be stored in a map database. The map data may be formed from information indicative of segments 110, 120, 130 interconnecting nodes, wherein the segments 110, 120, 130 represent a navigable network. Alternatively the map data may be formed by nodes associated with attributes wherein at least some attributes are indicative of connections 110, 120, 130 between nodes having common attributes representing a connection there-between. The connections are indicative of navigable segments 110, 120, 130 in the real world. The navigable segments may be road segments. It will be realised that the map data may be structured in a different manner.

Figure 5:
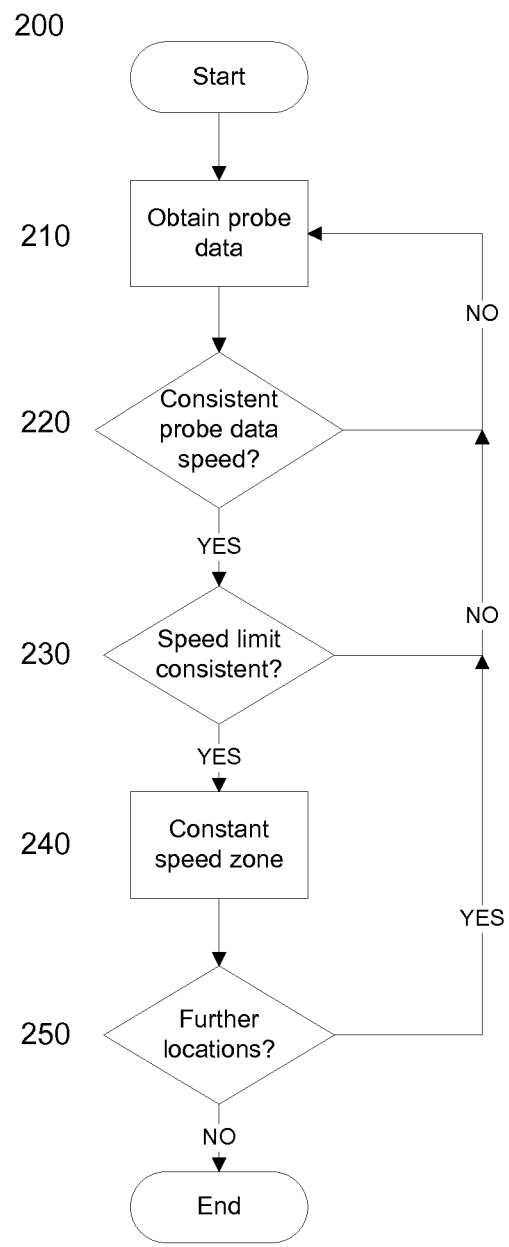
FIG. 5 shows a method of determining a constant speed zone according to an embodiment of the invention.

A method 200 of determining a constant speed zone of a navigable network based upon probe data associated with the network will now be explained with reference to FIG. 4. An embodiment of the method is illustrated in FIG. 5.

The method 200 comprises a step 210 of obtaining probe data. Probe data is data from one or more probes, such as vehicles, navigating the network represented by the map data 100. For example, where the map data 100 is representative of a portion of a road network the probe data is from one or more vehicles travelling through the road network. Data indicative of a speed of the one or more vehicles as they traverse the network is obtained. The data may be obtained by a device associated with the vehicle, such as being carried by the vehicle, communicating information indicative of a location of the vehicle at points in time such that the speed of the vehicle between the locations may be determined. The device may be a navigation device, a vehicle monitoring device associated with the vehicle, or may be a portable device carried within the vehicle such as a mobile phone or portable computing device. It will be realised that this list of devices from which probe data may be obtained is not exhaustive.

From the probe data historic speed profiles for road segments are determined. The historic speed profiles are stored that give the average speed of travel on segments 110, 120, 130 of the digital map 100 at all times of the day, in periodic intervals, for each day of the week. The periodic intervals may be 5 minute intervals, although it will be realised that other time intervals may be used. Thus, for a particular location in the map data 100, it is possible to obtain historic speed information indicative of an average speed of travel at that location for a particular time and day of the week. Where the probe data is obtained from a number of vehicles the historic speed information provides an accurate reflection of the speed of vehicles travelling along the road segment at the particular time of day. A method of generating speed profiles is provided in WO 2009/053411 A1, which is herein incorporated by reference.

In step 210 the obtaining of the probe data may comprise determining a location and obtaining the historic speed profile for the location from a database. As will be appreciated, the method 200 involves moving through the map data to determine the constant speed zones for the map data. Therefore the method 200 may be performed iteratively for successive point locations within the map data 100. For example the method may be performed repeatedly for locations within the map data 100 which are separated by a predetermined distance such as 250 m or 500 m, although it will be realised that other distances may be used. Alternatively the method may be performed for successive nodes of segments of the map data. A historic speed obtained from a speed profile for a current location will be denoted as avg_c whilst a historic speed for a preceding or previous location is denoted as avg_p. It will be noted that the preceding or previous location may be a location which is the predetermined distance behind the current location which may have been visited in a previous iteration of step 210.

In an exemplary iteration of step 210, the current location may be a location along the road segment 120. Therefore step 210 obtains the historic speed for the current location. In some embodiments the historic speed is determined for a particular time of day. The historic speed may be obtained from a speed profile obtained from a database based on the current location.

In step 220 it is determined whether the speed associated with the probe data is consistent. In particular it is determined whether the historic speed information is consistent between the current location and the previous location. It will be understood that the consistency is determined based upon a predetermined threshold speed change which may be indicated as K1. In one embodiment K1 may be 10 kmh$^{-1}$ although it will be realised that this is merely exemplary. In one embodiment the historic speed information is consistent between the current location and the previous location according to: $|avg\_c-avg\_p|<K1$. Therefore if the difference between the historic speed information for the current location and the previous location differ by less than the threshold speed change the method moves to step 230. If the historic speed information for the current location and the previous location differ by more than or equal the threshold speed change then the method returns to step 210 where probe data for a next location may be obtained.

It will be appreciated that, since in some embodiments, the speed profile is dependent upon the time and day, the constant speed zone may be time-dependent. That is, a constant speed zone may be determined to exist for between only certain times. For example, for some road segments the speed profile may be indicative of a constant speed of travel only between certain hours on certain days, rather than at all times. In these cases the constant speed zone may also be associated with validity information defining a period during which the constant speed zone is valid.

In step 230 it is determined whether a speed limit associated with the one or more road segments associated with the current and previous locations are consistent. That is, the method returns to step 210 if the speed limits associated with the road segments at the current and previous locations are different. If the speed limit changes between the current and previous locations, then vehicle speeds at those locations may be likely to change and thus the determination of a constant speed zone may be unreliable. If, however the speed limits associated with the current and previous locations is the same, or within a predetermined threshold, the method moves to step 240.

In step 240 it is determined that the current and previous locations form a constant speed zone. The constant speed zone is a portion of a road network, such as one or more road segments or a portion of a road segment where probe data is indicative of vehicles traversing the road network at a constant (at least within a threshold speed) average speed. If the previous location is already part of a constant speed zone determined in a previous iteration of step 240 then the current location is added to the previously determined constant speed zone.

In step 250 it is determined whether further locations are required to be examined. For example in step 250 it may be determined whether any further locations exist in the map data which have not been examined for forming part of a constant speed zone. If further locations exist, then the method returns to step 210. If the map data, or at least a portion thereof, has been fully examined then the method ends.

The method 200 described with reference to FIG. 5 may be performed by a computer, such as server computer, processing map data stored in the map database. Data indicative of the locations of one or more constant speed zones determined by the method 200 may be stored associated with the map data. In this way the method 200 may be used to process, in advance, the map data to determine the locations of one or more constant speed zones. However it will also be realised that, in other embodiments, the method 200 may be performed responsive to an event. The event may be receipt of information from a vehicle traversing the road network.

Referring to the exemplary road network illustrated in FIG. 4, the probe data from vehicles traversing the road segment 120 is not indicative of a constant speed zone associated with this road segment. This is due to the fact that, owing to curvatures or bends present in the road segment 120, vehicles do not maintain a constant, at least within the threshold speed change, average speed whilst traversing the road segment 120. In contrast, since the road segment 130 is generally linear, vehicles travelling along road segment 130 maintain a substantially constant average speed for at least a portion of the length of the segment 130. Therefore the road segment 130 is determined to be associated with a constant speed zone 140 as illustrated. It can be appreciated that embodiments of the present invention provide methods for determining a constant speed zone based on probe data. Data indicative of the constant speed zone may be stored associated with the road segment.

Figure 6:
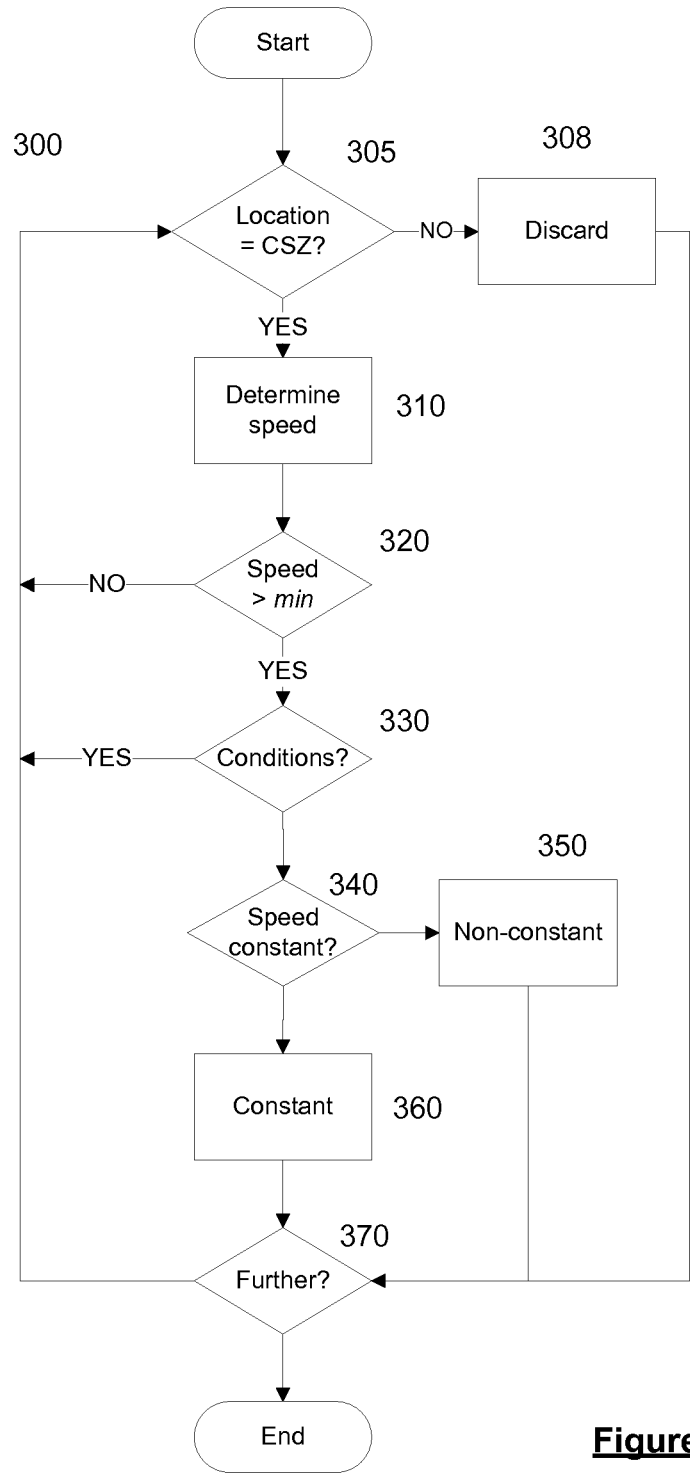
FIG. 6 shows a method of determining a constant speed performance indicator according to an embodiment of the invention.

Referring to FIG. 6, there is illustrated a method 300 of evaluating vehicle driving according to an embodiment of the invention. The method 300 evaluates vehicle driving with respect to maintaining an average speed within road segments, or portions thereof, where it is possible to maintain a generally constant average speed as indicated by probe data. The method 300 may be performed subsequent to the method 200 described with reference to FIG. 5. In this case one or more constant speed zones (CSZs) are determined in advance and stored accessible to the method 300. Alternatively the method 300 may be performed responsive to substantially real-time information associated with a vehicle. In this case the determination of a constant speed zone may be performed as part of the method 300, as will be explained.

The method 300 is performed responsive to information indicative of a location of a vehicle from which a speed of the vehicle can be determined, or information indicative of the location of the vehicle and speed information associated with the location information.

The method 300 comprises a step 305 of determining whether the location of the vehicle corresponds to a constant speed zone, i.e. whether the vehicle is currently located in the constant speed zone. It will be understood that the vehicle being located in the constant speed zone is intended to mean on a road corresponding to a road segment in the map data identified as a constant speed zone. As noted above, the determination in step 305 may be performed based upon stored data indicative of the location of one or more constant speed zones such as associated with digital map data. In which case, step 305 comprises accessing a data store for the information. In another embodiment step 305 may comprise determining whether the current location corresponds to a constant speed zone by accessing the probe data or information associated with the probe data such as the historic speed information for the current location. The method 200 may be performed for the current location in step 305. If the location of the vehicle does not correspond to a constant speed zone then the location is discarded in step 308. If the location is discarded then the evaluation of the vehicle driving is not performed based upon the current location. If the current location corresponds to a constant speed zone then the method moves to step 310.

In step 310 a speed of the vehicle is determined. The speed of the vehicle may be determined, in one embodiment, based upon the current location and a previous location of the vehicle. The vehicle speed between the current location and the previous location is determined based upon a time difference between those locations. In some embodiment the location of the vehicle is determined at predetermined time intervals, such as 10 seconds. Therefore the vehicle speed may be determined as a change in distance between the current location and the previous location divided by the change in time or time interval. In other embodiments the location information of the vehicle may be associated with speed information at each location. Therefore step 310 may comprise accessing the speed information.

In step 320 it is determined whether the vehicle speed is above a predetermined threshold speed, min. The threshold speed may be, for example, a fixed speed such as 30 kmh$^{-1}$. In another embodiment the threshold speed is based upon the historic speed information associated with the current location of the vehicle. The historic speed information may be that associated with a road segment corresponding to the current location. In one embodiment the historic speed information is associated with the road segment corresponding to the current location for the current day and time. The threshold speed may be a predetermined percentage of the historic speed. For example the threshold speed may be 50% of the historic speed although it will be realised that other percentages may be used.

In step 330, which is optional, the method may comprise determining whether one or more conditions exit which prevent the vehicle from maintaining a constant speed. The conditions may be determined to exist based upon received real-time information, such as substantially real-time probe data. The information may be indicative of whether traffic and/or road conditions, such as weather conditions, exist which prevent the vehicle maintaining the constant speed. The information may be received by the computer or device performing the method 300. Whilst step 330 is indicated as optional, this is not to be construed as being indicative of other steps of the method being essential. For example, step 330 may be used as an alternative to step 320 and/or may occur before step 320.

In step 340 it is determined whether a speed of the vehicle is generally constant. The determination is made with respect to a current speed of the vehicle and a previous speed of the vehicle. The current speed of the vehicle may be denoted as v_c and a previous speed of the vehicle may be denoted as v_p. Where the speed information is provided, as discussed above, v_c and v_p may be obtained directly, such as from the device associated with vehicle. However where the speed of the vehicle is determined from location information associated with the vehicle v_c may be calculated from a current location and a previous location and v_p from a plurality of previous locations. For example v_c may be calculated from a current location at time t and the previous location at time t−1, whilst v_p may be calculated from the location at the time t−1 and a previous location at time t−2.

The determination may be made with respect to a predetermined threshold speed change, which may be indicated as K2. The predetermined threshold speed change may be the same as that used in the method 200, i.e. K1, or may adopt a different value from that used in the method 200. For example, in one embodiment K2 may be 10 kmh$^{-1}$ although it will be realised that this is merely exemplary. The determination of whether the speed of the vehicle is constant may be made according to: |v_c−v_p|<K2. If the speed of the vehicle is constant, or changes by less than the threshold speed change, then the method moves to step 360. If the speed of the vehicle changes by more than the threshold speed change, then the method moves to step 350.

In order to evaluate vehicle driving, in one embodiment, a duration of constant speed driving is determined. In step 360 therefore the duration of constant speed driving dur_c may be incremented. The increment may be by calculating a duration of time between t−1 and t. In other embodiments the increment may be by a fixed increment of time such as the interval of time at which location information is provided which may be 10 seconds, although it will be realised that other intervals may be used. In some embodiments, a duration of non-constant speed driving may also be determined. In step 350 the duration of non-constant speed driving dur_n may be incremented. As noted above, the increment may be by calculating a duration of time between t−1 and t. The increment may alternatively be by a fixed increment of time, such as the interval of time at which location information is provided, e.g. 10 seconds. The evaluation of vehicle driving may be based upon the determined duration of constant speed driving, in one embodiment, or the determined duration of constant speed driving and the duration of non-constant speed driving.

In some embodiments a duration of constant speed driving is determined for each of a plurality of road categories. The road categories may be determined based upon information associated with the road segments 110, 120, 130 in the map data 100. The categories may be, for example, urban, extra-urban and major. A separate duration is determined in step 360 and, in some embodiments, also step 250 for each of the categories. The evaluation of vehicle driving is determined based upon the duration for each of the plurality of road categories.

In one embodiment the evaluation of vehicle driving is determined based upon a weighted duration according to the category of road. For example, the total duration of constant speed driving $D_c$ may be calculated according to:

$$D_c = d_u w_u + d_e w_e + d_m w_m$$

where $d_u$ is a duration of driving on roads categorised as urban, $d_e$ is a duration of driving on roads categorised as extra-urban, $d_m$ is a duration of driving on roads categorised as major and $w_u$, $w_e$, $w_m$ are corresponding weighting values.

The weighting values may be arranged to have an increasing weight according to a speed of roads associated with each category. For example the weighting values may be $w_u=0.2$, $w_e=0.5$ and $w_m=1$, although it will be realised that these are merely exemplary. Thus it can be appreciated that a greater weight is given to driving at constant speeds on road categories likely to have a higher driving speed since acceleration at higher speeds is likely to have a greater effect on fuel economy. An equivalent calculation may be performed to determine the duration of non-constant speed driving $D_n$ determined in step 350.

In one embodiment a value indicative of vehicle driving efficiency may be determined by dividing the duration of constant speed driving $D_c$ by the duration of non-constant speed driving $D_n$ to determine a unit-less value indicative of driving efficiency.

In step 370 it is determined whether further location or speed information is to be considered by the method 300. If no further information exists, for example because a journey of the vehicle has ended, the method ends. Otherwise the method returns to step 305.

It will be appreciated that the method 300 illustrated in FIG. 6 provides a method of evaluating vehicle driving with respect to efficiency based upon the speed of the vehicle in relation to probe data.

A system according to an embodiment of the invention comprises an electronic device associated with a vehicle. The device is capable of determining its geographic location. The determination of the geographical location may be made from received wireless signals which may comprise: navigation signals, such as GPS, Galileo, GLONASS. etc; communication signals, such as WiFi, cellular communication signals. such as 3G, 4G, UMTS, etc. The device has a processor for operatively executing instructions. In one embodiment the device has access to a data store storing information indicative of constant speed zones. The data store may be local to the device or accessed remotely via a communication link. In which case the device may perform the method 300 described above.

In one embodiment the device is arranged to determine journey information indicative of each journey made by the vehicle. The journey information is stored in a memory of the device. The journey information may comprise information indicative of the location of the vehicle at each interval of time. In this way the journey information comprises a series of locations of the vehicle. The journey information is communicated from the device to a server computer via a communication link. The journey information may be communicated substantially in real-time for example to allow real time tracking of the vehicle or may be periodically communicated to the server.

The server comprises a memory for storing received journey information. The server further comprises one or more processors for operatively executing instructions. The server may be arranged to perform a method 300 as illustrated in FIG. 6. The server is communicatively coupled to a data store storing map data. The data store comprises information indicative of the location of one or more constant speed zones. The location may be an association between the constant speed zone and a respective road segment 130 in the map data 100. The server may perform an embodiment of the method 300 based on journey information received from the device via the communication link. Information indicative of the driving evaluation resulting from the method 300 may be output from the server. The information may be communicated to another computer, such as in the possession of a fleet manager, in order to monitor and evaluate driving of the vehicle. Alternatively or additionally the information indicative of the driving evaluation may be provided to the device via the communication link for outputting to the driver of the vehicle. It will be realised that the information may be output to the driver from the device regardless of whether the method 300 is performed by the server or the device.

Any of the methods in accordance with the invention as described above may be implemented at least partially using software, e.g. computer programs. The present invention thus also extends to a computer program comprising computer readable instructions executable to perform, or to cause a computing device, e.g. OBD adapter, vehicle tracking device, navigation device, server, etc, to perform, a method according to any of the above described aspects or embodiments of the invention. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

The invention claimed is:

1. A method of evaluating the driving of a vehicle performing a journey on a road network, comprising:
    determining at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;
    determining a speed of the vehicle traversing the road network at a plurality of times during the journey;
    determining a value indicative of a consistency of the speed of the vehicle within the at least one constant speed zone, the determining comprising determining that the speed of the vehicle is not consistent between two locations in a given constant speed zone from the at least one constant speed zone when a difference between determined speeds at each of the two locations exceeds a threshold speed change; and
    presenting, to a user, based on the value indicative of the consistency of the speed of the vehicle within the at least one constant speed zone, advice indicating modifications of a driving style for driving the vehicle in order to improve an economy of driving the vehicle on the journey.

2. The method of claim 1, wherein the expected speeds of travel comprise historic speed profiles associated with respective segments in map data representing the road network.

3. The method of claim 2, wherein each historic speed profile is indicative of an average speed of travel of one or more vehicles along the respective segment.

4. The method of claim 1, wherein constant speed zone is associated with validity information defining a validity period for the constant speed zone.

5. The method of claim 1, wherein the constant speed zone is associated with at least a portion of a road in the road network.

6. The method of claim 5, wherein the constant speed zone is determined based upon the positional data being indicative of at least one vehicle having a substantially constant speed of travel at first and second locations along the at least a portion of the road network.

7. The method of claim 1, wherein the constant speed zone is further determined based upon a speed limit associated with one or more roads in the road network.

8. The method of claim 1, comprising determining whether the speed of the vehicle is at least a predetermined threshold speed.

9. The method of claim 1, comprising determining whether the speed of the vehicle is influenced by one or more of road and traffic conditions.

10. The method of claim 1, wherein the value indicative of the consistency of the speed of the vehicle is a duration for which the speed of the vehicle is substantially constant within the constant speed zone.

11. The method of claim 10, wherein the value indicative of the consistency of the speed of the vehicle comprises a plurality of durations each associated with a respective category of road for which the speed of the vehicle is substantially constant within the constant speed zone.

12. The method of claim 1, comprising determining a value indicative of the consistency of the speed of the vehicle is a duration for which the speed of the vehicle is not substantially constant within the constant speed zone.

13. The method of claim 12, wherein the speed of the vehicle is not substantially constant within the constant speed zone when a difference in speed at first and second locations exceeds a threshold speed change.

14. The method of claim 1, comprising determining whether a location of the vehicle corresponds to a location of the constant speed zone.

15. The method of claim 1, wherein the value indicative of the consistency of the speed of the vehicle within the constant speed zone is weighted according to a category of road associated with the constant speed zone.

16. An apparatus for evaluating the driving of a vehicle performing a journey on a road network comprising: one or more processors; and a memory comprising instructions which, when executed by the one or more processors, cause the apparatus to:
- determine at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;
- determine a speed of the vehicle traversing the road network at a plurality of times during the journey;
- determine a value indicative of a consistency of the speed of the vehicle within the at least one constant speed zone, the determining comprising determining that the speed of the vehicle is not consistent between two locations in a given constant speed zone from the at least one constant speed zone when a difference between determined speeds at each of the two locations exceeds a threshold speed change; and
- present, to a user, based on the value indicative of the consistency of the speed of the vehicle within the at least one constant speed zone, advice indicating modifications of a driving style for driving the vehicle in order to improve an economy of driving the vehicle on the journey.

17. A non-transitory computer readable medium comprising computer readable instructions that, when executed by at least one processor of an apparatus, causes the apparatus to perform a method for evaluating a driving of a vehicle performing a journey on a road network, the method comprising:
- determining at least one constant speed zone of the road network, a constant speed zone being a portion of the road network at which the vehicle can travel at a constant speed, said determination being based upon expected speeds of travel along the road network determined from positional data relating to the movements of a plurality of vehicles over time along the road network;
- determining a speed of the vehicle traversing the road network at a plurality of times during the journey;
- determining a value indicative of a consistency of the speed of the vehicle within the at least one constant speed zone, the determining comprising determining that the speed of the vehicle is not consistent between two locations in a given constant speed zone from the at least one constant speed zone when a difference between determined speeds at each of the two locations exceeds a threshold speed change; and
- presenting, to a user, based on the value indicative of the consistency of the speed of the vehicle within the at least one constant speed zone, advice indicating modifications of a driving style for driving the vehicle in order to improve an economy of driving the vehicle on the journey.

* * * * *